(12) United States Patent
Itamoto et al.

(10) Patent No.: US 9,609,398 B2
(45) Date of Patent: Mar. 28, 2017

(54) CONTENT AND POSTED-INFORMATION TIME-SERIES LINK METHOD, AND INFORMATION PROCESSING TERMINAL

(71) Applicant: NEC Corporation, Tokyo (JP)

(72) Inventors: Shinichi Itamoto, Kawasaki (JP); Hideaki Tanaka, Kawasaki (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/381,560

(22) PCT Filed: Feb. 28, 2013

(86) PCT No.: PCT/JP2013/055513
§ 371 (c)(1),
(2) Date: Aug. 27, 2014

(87) PCT Pub. No.: WO2013/133133
PCT Pub. Date: Sep. 12, 2013

(65) Prior Publication Data
US 2015/0128168 A1 May 7, 2015

(30) Foreign Application Priority Data
Mar. 8, 2012 (JP) .................................. 2012-052240

(51) Int. Cl.
H04N 7/10 (2006.01)
H04N 21/858 (2011.01)
(Continued)

(52) U.S. Cl.
CPC .......... H04N 21/858 (2013.01); H04H 20/18 (2013.01); H04H 60/37 (2013.01); H04H 60/40 (2013.01);
(Continued)

(58) Field of Classification Search
CPC . H04N 21/812; H04N 21/4331; H04N 21/435
See application file for complete search history.

(56) References Cited

U.S. PATENT DOCUMENTS 5,600,775 A * 2/1997 King et al. ..................... 715/203
2004/0128701 A1 * 7/2004 Kaneko .............. H04N 7/17318
725/136
(Continued)

FOREIGN PATENT DOCUMENTS

EP 1 705 904 A1 9/2006
JP 2005-184180 A 7/2005
(Continued)

OTHER PUBLICATIONS

International Search Report, corresponding to PCT/JP2013/055513, dated May 28, 2013, 2 pages.
(Continued)

Primary Examiner — Nathan Flynn
Assistant Examiner — Alfonso Castro
(74) Attorney, Agent, or Firm — Wilmer Cutler Pickering Hale and Dorr LLP

(57) ABSTRACT

An information processing terminal includes an operation part to receive a user's operation, an output part to play back an arbitrarily input content while outputting posted information which is posted on the WEB in connection with the content, and a controller to output a content at a playback time, correlated to a posted time of posted information selected via the user's operation, to the output part with reference to a time table which stores the playback position of the content in connection with the posted time of the posted information relating to the content. The controller aligns a plurality of posted information, correlated to a desired content, in an order of posted times on the screen. Upon receiving a user's scroll operation, it is possible to
(Continued)

scroll and display a plurality of posted information at the predetermined position on the screen.

8 Claims, 12 Drawing Sheets

(51) Int. Cl.
    *H04H 60/37*     (2008.01)
    *H04H 60/40*     (2008.01)
    *H04N 21/262*     (2011.01)
    *H04N 21/41*     (2011.01)
    *H04N 21/466*     (2011.01)
    *H04N 21/472*     (2011.01)
    *H04N 21/4788*     (2011.01)
    *H04N 21/643*     (2011.01)
    *H04N 21/81*     (2011.01)
    *H04H 20/18*     (2008.01)
    *H04H 60/65*     (2008.01)

(52) U.S. Cl.
    CPC ...... *H04H 60/65* (2013.01); *H04N 21/26258* (2013.01); *H04N 21/4126* (2013.01); *H04N 21/4668* (2013.01); *H04N 21/4788* (2013.01); *H04N 21/47217* (2013.01); *H04N 21/64322* (2013.01); *H04N 21/8133* (2013.01)

(56) References Cited

U.S. PATENT DOCUMENTS

| | | | |
|---|---|---|---|
| 2007/0006080 A1* | 1/2007 | Finger | G11B 27/005 715/719 |
| 2007/0245243 A1* | 10/2007 | Lanza et al. | 715/723 |
| 2008/0046925 A1* | 2/2008 | Lee et al. | 725/37 |
| 2008/0120501 A1* | 5/2008 | Jannink et al. | 713/163 |
| 2008/0159724 A1* | 7/2008 | Purvis et al. | 386/126 |
| 2010/0100904 A1* | 4/2010 | Kawakami et al. | 725/37 |
| 2010/0251295 A1* | 9/2010 | Amento | G11B 27/034 725/38 |
| 2011/0202537 A1 | 8/2011 | Shamma et al. | |

FOREIGN PATENT DOCUMENTS

| | | |
|---|---|---|
| JP | 2005-223534 A | 8/2005 |
| JP | 2008-148071 A | 6/2008 |
| JP | 2010-004309 A | 1/2010 |
| JP | 2010-010744 A | 1/2010 |
| WO | WO-2008/108293 A1 | 9/2008 |

OTHER PUBLICATIONS

Extended European Search Report corresponding to European Application No. 13757099.0, dated Nov. 2, 2015, 6 pages.

\* cited by examiner

FIG. 5

POSTED INFORMATION TABLE (431)

| POSTER ID | POSTED TIME | POSTED INFORMATION | CONTENT ID |
|---|---|---|---|
| 11111 | 2011.10.01.00:01 | × × × × × | |
| 22222 | 2011.10.01.00:02 | × × × × × | |
| ..... | ..... | ..... | ..... |
| 33333 | 2011.10.10.19:03 | NICE HIT! | 0100 |
| 44444 | 2011.10.10.19:04 | × × × × × | 0200 |
| 55555 | 2011.10.10.19:05 | CHEER UP HANSHIN, #yakyu | 0100 |
| 66666 | 2011.10.10.19:10 | × × × × × | 0300 |
| 77777 | 2011.10.10.19:12 | HARA-SAN, PLEASE! | 0100 |
| 88888 | 2011.10.10.19:13 | SHOW SOUL OF TIGERS! #hanshin | 0100 |
| 99999 | 2011.10.10.19:15 | × × × × × | 0400 |
| 00000 | 2011.10.10.19:16 | WATCHING GAME WITH DRINKING BEER ♪ #kyojin | 0100 |

CONTENT AND POSTED-INFORMATION TIME-SERIES LINK METHOD, AND INFORMATION PROCESSING TERMINAL

CROSS-REFERENCE TO RELATED APPLICATIONS

The present application is a national stage application of International Application No. PCT/JP2013/055513, filed on Feb. 28, 2013, which claims benefit to Japanese Patent Application No. JP2012-052240, filed on Mar. 8, 2012, the disclosures of which are incorporated herein in their entirety by reference thereto.

TECHNICAL FIELD

The present invention relates to a content and posted-information time-series link method which links contents with posted information in a time-series manner when receiving and reproducing audio-video contents via the Internet or an information sharing system (WEB), and an information processing terminal which reproduces contents in connection with posted information.

BACKGROUND ART

Recently, mobile terminals such as smart phones and tablet information processing terminals have become widespread. Additionally, mobile terminals having functions of receiving television broadcasting waves and Internet-connecting functions have become widespread. Users (or subscribers) may view and browse audio-video contents with mobile terminals. Users of mobile terminals may submit images and text data via social networking services (SNS) such as Twitter (registered trademark) and Facebook (registered trademark) so as to share current statuses on the WEB (an information sharing system on the Internet) among a plurality of users, thus mutually sharing current thoughts of users.

Patent Literature Document 1 discloses a subtitled video playback device which allows each user to view desired scenes via operations to select subtitles when playing back subtitled broadcast contents. Specifically, when mobile phones including TV tuners display subtitle lists of broadcast contents, users may carry out operations to select subtitles within subtitle lists so as to play back broadcast contents at playback times (time codes) of subtitles or at playback tracks (hereinafter, referred to as playback positions).

CITATION LIST

Patent Literature Document

Patent Literature Document 1: Japanese Patent Application Publication No. 2010-10744

SUMMARY OF INVENTION

Technical Problem

To record and play back broadcast contents with information processing terminals, posted information may be concurrently displayed in connection with broadcast contents during playback of broadcast contents. In this case, posted information and broadcast contents may not be linked together. To play back broadcast contents after a long time elapsed from recording of broadcast contents, for example, it is presumed that someone may submit information different from topics currently relating to broadcasting contents. This causes a problem in that any users of information processing terminals cannot browse posted information, relating to broadcast contents, during playback of broadcast contents which were broadcast in the past.

Recently widespread on-demand broadcast services may allow users of information processing terminals to download broadcast contents or receive stream-distributed broadcast contents, which are related to programs broadcast in the past but which are not recorded, via the Internet or information sharing systems, thus viewing broadcast contents at desired time and date. Considering the situation in which broadcast contents relating to previously broadcast programs are accumulated and then received and played back via servers of broadcast networks, the foregoing problem in which users cannot view posted information mutually connected with broadcast contents will probably emerge.

The present invention aims to solve the foregoing problem, and therefore it is an object of the invention to provide a method of linking posted information with contents in a time-series manner when receiving and playing back audio-video contents via the Internet or information sharing systems (WEB), and an information processing terminal which plays back contents in connection with posted information.

Solution to Problem

The present invention is directed to an information processing terminal including an operation part which receives a user's operation; an output part to play back an arbitrarily input content while outputting posted information posted on the WEB in connection with the content; and a controller to send a content at a playback position, correlated to a posted time of posted information specified via a user's operation, to the output part with reference to a time table which stores the playback position of the content in connection with the posted time of the posted information correlated to the content. The output part has a display screen to concurrently display the content and the posted time, and therefore a plurality of posted information is displayed on the display screen in a time-series manner corresponding to the order of posted times in synchronization with the playback of the content. The controller plays back the content from the playback position correlated to the posted time of desired posted information selected via a user's operation. Herein, a user may carry out a scroll operation to scroll a plurality of posted information so as to select desired posted information.

The present invention is directed to an information processing method including the steps of: receiving a user's operation; playing back an arbitrarily input content; outputting posted information posted on the WEB in connection with the content; and outputting a content at a playback position, correlated to the posted time of posted information specified via a user's operation with reference to a time table which stores the playback position of the content in connection with the posted time of the posted information correlated to the content.

The present invention is directed to an information processing terminal connectible to an external server via an information sharing system (WEB), installing a content and posted-information time-series link method including the steps of: receiving a desired content; acquiring a plurality of posted information, which is posted on the information sharing system in connection with the content, from the external server; displaying a plurality of posted information in a time-series manner according to the order of posted times; determining a playback position of a content, correlated to the posted time of desired posted information selected via a user's operation among a plurality of posted information with reference to a time table which stores the playback position of the content in connection with the posted time of the posted information; and playing back the content at the playback position.

Advantageous Effects on Invention

In the present invention which manages a plurality of posted information posted on the WEB in connection with broadcast contents in an order of posted times, it is possible to concurrently display a plurality of posted information together with broadcast contents which are recorded and played back with an information processing terminal. Upon a user's operation to select desired posted information, it is possible to play back the recorded contents at the playback position connected with the posted time of the posted information. As a user's operation, it is possible to employ a scroll operation to scroll a plurality of posted information on the screen. Thus, the playback position of the recorded content is automatically determined in connection with a user's operation to select the posted information, and therefore the recorded content is played back at the playback position. Therefore, it is possible for each user to save the trouble of searching posted information registered in an external server by himself, and it is possible to improve operability of an information processing terminal. In this connection, it is possible to meet the users' convenience of appreciating recorded contents since playback times of recorded contents are set to precede posted times of posted information by predetermined times.

BRIEF DESCRIPTION OF DRAWINGS

FIG. 5 is a table showing an example of the stored content of a posted information table stored in a server storage unit.

DESCRIPTION OF EMBODIMENTS

First Embodiment

Figure 1:
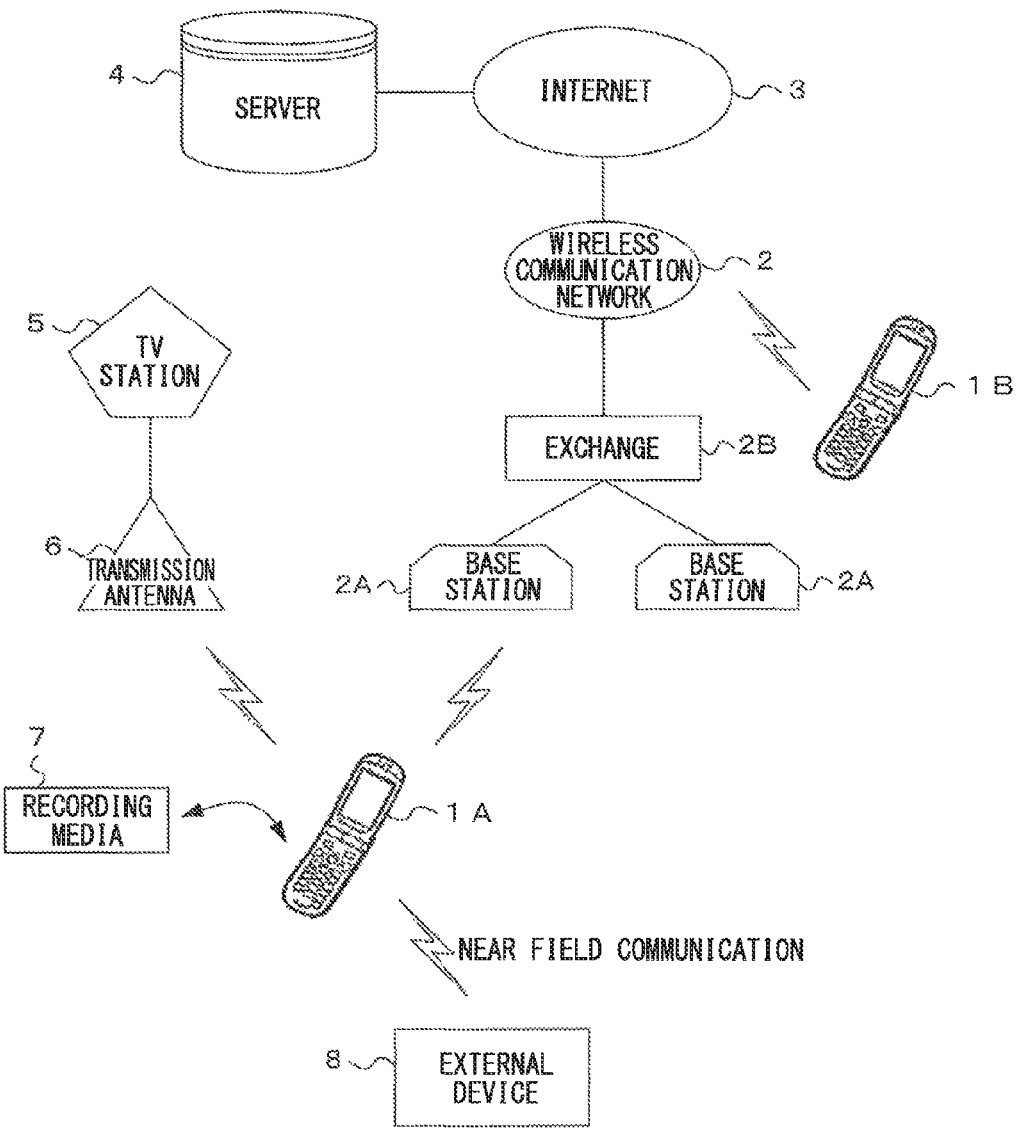
FIG. 1 is a configuration diagram of a communication network system adopting an information processing terminal according to the present invention.

The information processing terminal and its function according to the present invention will be described in detail. FIG. 1 shows the outline of the information sharing system (WEB) or the communication network system adopting the information processing terminal of the present invention. The first embodiment of the present invention applies a mobile terminal 1 (1A, 1B) serving as an information processing terminal to the communication network system. This is not a restriction to the present invention; hence, it is possible to employ a smart phone, a portable game device, PDA (Personal Digital Assistant), a tablet PC, and a notebook PC (Personal Computer) as an information processing terminal.

For example, the mobile terminal 1 has a communication function, an electronic mail function, an Internet-connecting function (a Web access function), and a television function (i.e. a television broadcast receiving function and a recording function) of receiving and viewing digital television broadcasting (e.g. one-segment terrestrial television broadcasting). The recording function may include a function of recording audio contents in addition to a function of recording video contents upon receiving television broadcasting.

The mobile terminal 1A is connected to a wireless communication network (a mobile communication network) 2 via a nearby base station 2A and an exchange 2B. Thus, the mobile terminal 1A is able to communicate with another mobile terminal 1B via the wireless communication network 2. Upon being connected to the Internet 3 via the wireless communication network 2, the mobile terminal 1A is able to access a desired WEB site and to browse desired information. Additionally, the mobile terminal 1A has a streaming function of downloading and playing back multimedia content data such as moving images, still images, music, and news from a server 4 via the wireless communication network 2 and the Internet 3.

The mobile terminal 1A is able to receive content data of terrestrial digital broadcasting transmitted via a transmission antenna 6 of a TV station 5. The mobile terminal 1A may serve as an Internet radio able to receive and download digital broadcasting contents from the server 4 via the wireless communication network 2 and the Internet 3. Thus, the mobile terminal 1A is able to receive broadcast content data via the television function or to download streaming content data via the Internet-connecting function. Additionally, the mobile terminal 1A is able to read various content data from a storage medium 7 such as a detachable portable memory card and to acquire various content data from the other mobile terminal 1B or an external device 8 via near field communication such as Bluetooth (registered trademark) communication and infrared communication.

A user may operate the mobile terminal 1A to produce information posted on the WEB, thus transmitting the information to the server 4 via the Internet 3. The server 4 receives and stores the posted information together with the posted time, thus opening the posted information on the WEB. That is, the server 4 stores the posted information from many users so as to open the posted information on the WEB. A user of the mobile terminal 1A may receive and browse the posted information, posted by other users, from the server 4 via the Internet 3. As the server 4 which is able to open the posted information, for example, it is possible to name a community site such as Twitter.

The mobile terminal 1A is able to receive and record broadcast contents of the TV station 5 and to play back broadcast contents later. In the following description, broadcast contents recorded with the mobile terminal 1A will be referred to as recorded contents.

Figure 2:
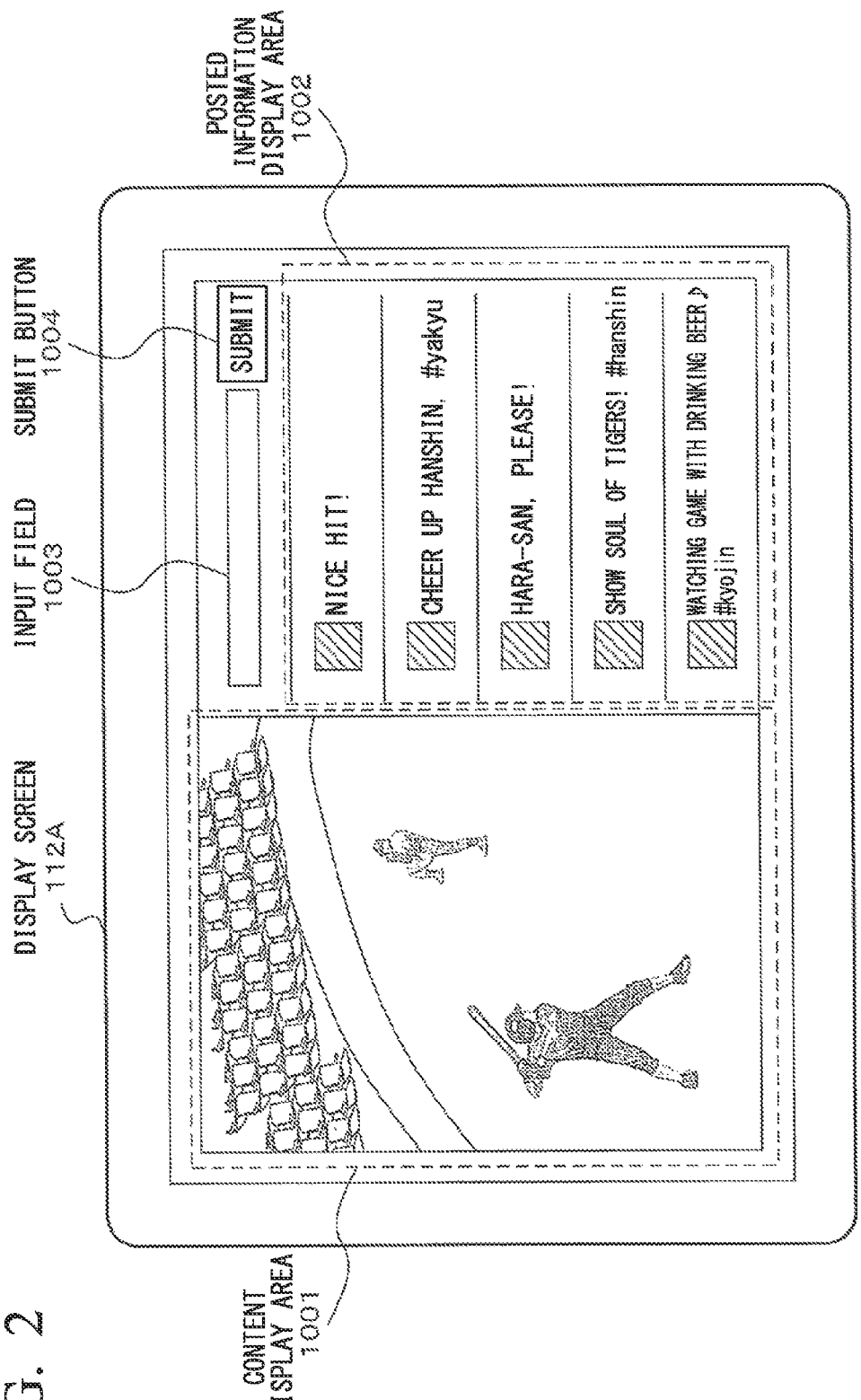
FIG. 2 is an illustration showing an example of a display screen of a mobile terminal serving as an information processing terminal according to the first embodiment of the present invention.

FIG. 2 shows an example of a recorded content which is received with the mobile terminal 1A and displayed on a display screen 112A. The left half of the display screen 112A represents a content display area 1001 while the right half thereof represents a posted information display area 1002. An input field 1003 and a submit button 1004 are disposed above the posting information display area 1002.

The content display area 1001 displays playback images of recorded contents while the posted information display area 1002 displays a plurality of posted information. As shown in FIG. 2, the mobile terminal 1A is able to concurrently display contents and posted information on the display screen 112A. The posted information display area 1002 displays a plurality of posted information linked with recorded contents displayed on the content display area 1001. In this connection, the "posted information linked with recorded contents" represents the posted information which was submitted by other information processing terminals in the time zone in which the recorded contents displayed on the content display screen 1001 were being broadcast, i.e. the posted information including items related to the recorded contents.

When a user operates the mobile terminal 1A to receive posted information submitted from other information processing terminals, the mobile terminal 1A receives the latest posted information among posted information opened on the WEB. When a user operates the mobile terminal 1A to play back recorded contents, the user may browse previous posted information submitted in the time zone in which recorded contents were broadcast. Conventionally, users of information processing terminals need to search desired posted information by way of search functions via the Internet. The mobile terminal 1A of the first embodiment is designed to selectively and concurrently display posted information relating to recorded contents together with recorded contents displayed on the display screen 112A. This eliminates the trouble in which a user needs to operate the mobile terminal 1A so as to search desired posted information. Since posted information relating to recorded contents is displayed together with recorded contents on the display screen 112A, a user may appreciate recorded contents, which were broadcast in the past, in real time. Additionally, the mobile terminal 1A of the first embodiment sets top positions of recorded contents or changes playback positions (i.e. time codes or playback tracks). In this connection, a user may operate the mobile terminal 1A to select single posted information from among a plurality of posted information displayed in the posted information display area 1002.

Upon a user's operation to select posted information, the mobile terminal 1A skips (or moves) over to the playback position based on the posted time of the selected posted information from the playback position of the recorded content currently displayed in the content display area 1001; thus, it is possible to restart playing back the recorded content at the playback position. Upon a user's operation to select posted information at the posted time "19:00", for example, the mobile terminal 1A skips over to the playback position of the recorded content, which was broadcast one minute before, i.e. "18:59", so as to set a top position of the recorded content, thus starting playing back of the recorded content from the top position.

As described above, the present embodiment is designed to skip over to the playback position of the recorded content so as to restart playing back the recorded content from the playback position based on the posted time of the posted information selected by a user's operation. Conventional technologies can set top positions of recorded contents solely based on playback times (or time codes) of recorded contents while the present embodiment can set top positions of recorded contents based on a steam of posted information or posted information being posted at the times of broadcasting recorded contents. That is, the present embodiment provides a user's operation enabling the cuing of recorded contents not disclosed in conventional technologies.

Details will be described later. With reference to a time table correlating playback positions of recorded contents to posted times of posted information submitted in connection with recorded contents, the mobile terminal 1A displays recorded contents in the content display area 1001 based on playback positions relating to posted information specified by a user's operation among a plurality of posted information displayed in the posted information display area 1002. That is, the present embodiment links posted times of posted information with playback times of recorded contents in a time-series manner. In other words, the mobile terminal 1A of the present embodiment is able to change playback positions of recorded contents, displayed in the content display area 1001, in connection with posted information displayed in the posted information display area 1002 of the display screen 112A.

To execute the cuing of the recorded content, as described above, the top position of the recorded content is set to the playback position corresponding to the broadcast time preceding the posted time of the posted information selected by a user's operation. Thus, a user of the mobile terminal 1A is able to reliably view the recorded content at the posted time of the posted information since the mobile terminal 1A starts playing back the recorded content at the timing before the posted time of the posted information selected by a user's operation.

Details will be described later. The mobile terminal 1A is able to display the recorded content in the content display area 1001 from the previous playback position preceding the playback time, correlated to the posted time in the time table in advance, by a predetermined time since the previous playback position serves as the playback position correlated to the posted information specified by a user's operation among a plurality of posted information displayed in the posted information display area 1002.

Alternatively, the mobile terminal 1A may display the recorded content in the content display area 1001 from the subsequent playback position subsequent to the playback position, correlated to the posted time in the time table in advance, by a predetermined time since the subsequent playback position serves as the playback time correlated to the posted information specified by a user's operation among a plurality of posted information displayed in the posted information display area 1002. In this case, the mobile terminal 1A may start playing back the recorded content from the playback position slightly later than the posted time of the posted information selected by a user's operation.

As described above, the function of playing back the recorded content before or after the playback time corresponding to the posted time of the posted information selected by a user's operation may effectively work when a viewer already knew about the climax scene of the broadcast content or when a viewer plays back the broadcast content at the moment of elapsing from the last day of the year to the new year's day. For example, it is possible to start playing back the recorded content from the playback position corresponding to the climax scene of a broadcast content in which a hero shows "In-Ro" (a portable small box keeping a seal impression denoted with an emblem of the Tokugawa family) in a popular television program in Japan, called "Mito-Komon" (representing the name of a feudal lord of the Mito clan in a historical play with the motif of the Edo period). The mobile terminal 1A of the present embodiment is designed to play back the recorded content from the previous playback time preceding the playback time, correlated to the posted time in the time table in advance, by a predetermined time.

A user may operate the mobile terminal 1A with a touch operation on the display screen 112A to produce posted information by himself, thus submitting the posted information onto the WEB. In this operation, a user produces posted information so as to submit the posted information onto the WEB by user of the input field 1003 and the submit button 1004. The input field 1003 is an area to input a string of characters forming posted information in response to a user's operation. The submit button 1004 is an area which a user uses to submit the posted information input in the input field 1003. First, a user operates the input field 1003 to display a character string corresponding to posted information. Then, a user touches the submit button 1004. Thus, the mobile terminal 1A transmits the posted information, corresponding to the character string input in the input field 1003, to the server 4, which in turn opens the posted information on the WEB.

Figure 3:
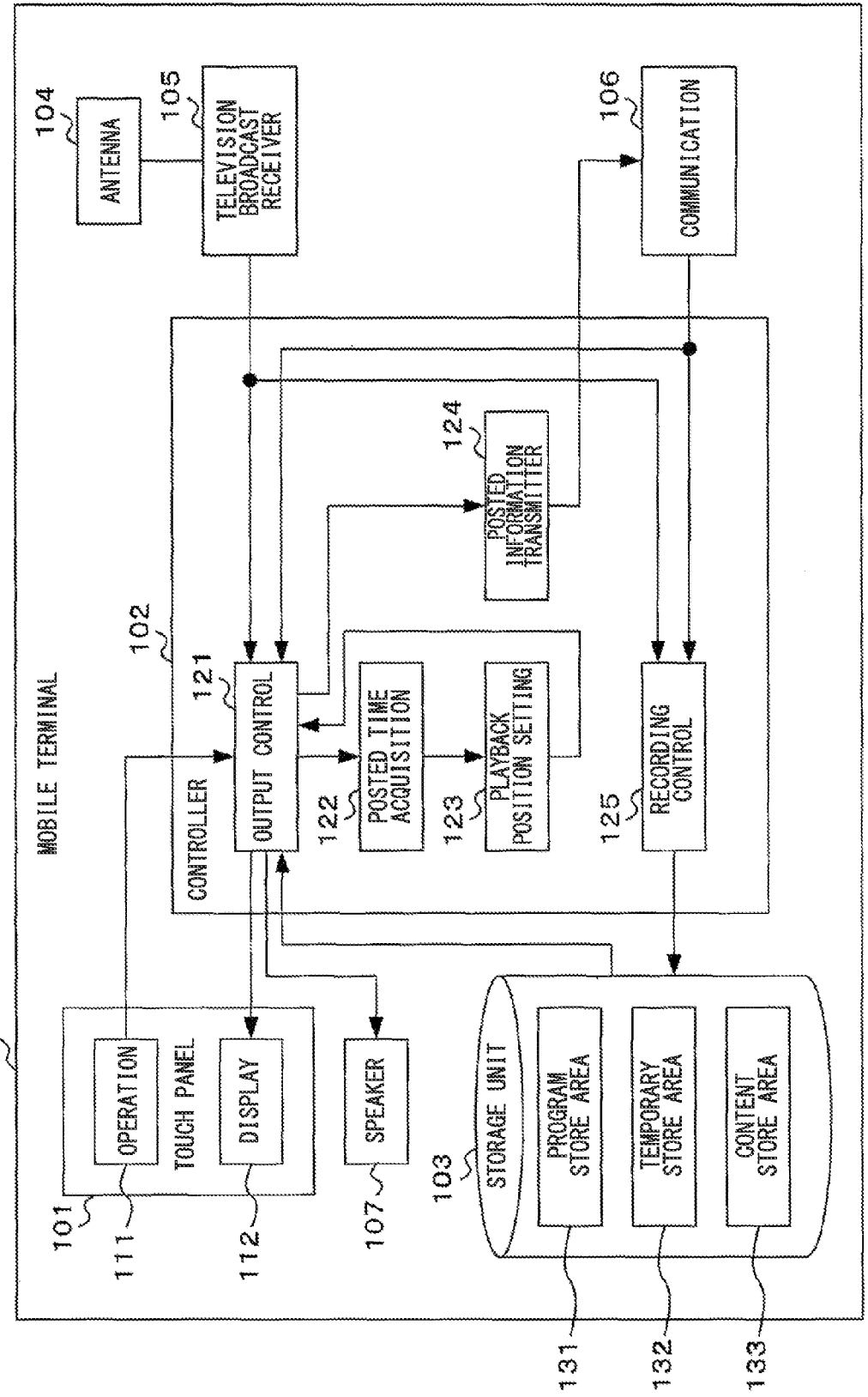
FIG. 3 is a block diagram showing basic constituent elements of the mobile terminal according to the first embodiment of the present invention.

FIG. 3 is a block diagram showing basic constituent elements of the mobile terminal 1A. The mobile terminal 1A includes a touch panel 101, a controller 102, a storage unit 103, an antenna 104, a television broadcast receiver 105, a communication part 106, and a speaker 107. For the sake of simplifying the description of the present embodiment, various parts relating to audio playback output operations are not shown in FIG. 3. In this connection, the constituent elements and the functions installed in the mobile terminal 1A can be partially installed in the server 4. For example, the function of the controller 102 can be installed in the server 4.

The touch panel 101 includes an operation part 111 and a display 112. The operation part 111 includes sensors to receive user's operations so as to send the detection result of sensors to the controller 102. The operation part 111 detects the touch position of a user's finger touching the operation screen at each time interval, thus outputting the detection result of sensors. This is not a restriction to the present invention. For example, it is possible to detect the position of a user's finger or an operation instructing member (e.g. a stylus pen) approaching the operation screen by use of non-touch sensors.

The display 112 displays the predetermined content under the control of the controller 102. The display 112 is combined with the operation part 111 to integrally form the touch panel 101, wherein the operation part 111 displays the operation screen used to receive a user's operation. The display 112 displays the display screen 112A shown in FIG. 2. Additionally, the display 112 forms the output part.

The controller 102 reads various pieces of information stored in the storage unit 103 so as to control the overall function of the mobile terminal 1A. The controller 102 includes an output control part 121, a posted time acquisition part 122, a playback position setting part 123, a posted information transmitter 124, and a recording control part 125.

The output control part 121 outputs the posted information, which is searched in connection with the recorded content, to the display part 112 together with the recorded content. The output control part 121 changes the playback position of the pre-stored content with a top position of content in accordance with the user's setting. In the present embodiment, pre-stored contents are broadcast contents which were received by the television broadcast receiver 105 and stored in a content store area 133 of the storage unit 103. Herein, pre-stored contents may include audio contents broadcast by radio. In the following description, however, audio-video contents (i.e. broadcast contents) received with the television broadcast receiver 105 are stored in the content store area 133 of the storage unit 103 as pre-stored contents. In this connection, pre-stored contents corresponding to audio-video contents (broadcast contents) may be referred to as recorded contents.

The output control part 121 selectively reads the recorded content, specified by a user's operation on the operation part 111, from among a plurality of recorded contents stored in the content store area 133 of the storage unit 103. Thereafter, the output control part 121 plays back the recorded content to display its video on the display 112 while generating sound via the speaker 107 in synchronism with video.

The output control part 121 transmits a posted information request to the server 4 via the communication part 106 before sending the posted information to the display 112. In response to the posted information request, the server 4 transmits the posted information to the mobile terminal 1A, in which the posted information is sent to the output control part 121 via the communication part 106. The output control part 121 displays the posted information, transmitted from the server 4, on the display 112. The output control part 121 concurrently displays the recorded content and the posted information on the display screen 112A in a predetermined manner. For example, a plurality of posted information is aligned in a time-series manner in the order of posted times and displayed in the posted information display area 1002. Herein, the posted time represents the time of posting information on the WEB. The present embodiment manages a plurality posted information in accordance with posted times. The posted information relating to the recorded content displayed in the content display area 1001 is displayed in the posted information display area 1002. In the present embodiment, the posted information posted on the WEB at the posted time corresponding to the playback position of the recorded content displayed in the content display area 1001 is displayed in the posted information display area 1002 in connection with the recorded content. In other words, the posted information posted on the WEB at the time of airing the broadcast content is displayed on the display 112 in connection with the playback position of the recorded content at the time of playing back the recorded content corresponding to the broadcast content.

To concurrently display the recorded content and the posted content on the display screen 112A, the output control part 121 transmits a posted information request, requesting the posted information relating to the recorded content, via the communication part 106. In response to the posted information request, the output control part 121 acquires the posted information, transmitted from the server 4, in connection with the recorded content.

To concurrently display the recorded content and the posted information on the display screen 112A, the output control part 121 may select only the posted information of a poster having an attribute (e.g. a poster ID, a user's name) specified via a user's operation from among a plurality of posted information, thus displaying the posted information on the display 112. To browse the posted information of an especially attractive poster, a user may carry out the above operation to selectively display the posted information of an attractive poster.

The output control part 121 may directly input the broadcast content, received with the television broadcast receiver 105, so as to play back the broadcast content in real time by use of the display 112 and the speaker 107. Alternatively, the output control part 121 may directly input the audio-video content, downloaded via the communication part 106, to play back the audio-video content by use of the display 112 and the speaker 107.

As shown in FIG. 2, when the recorded content and the posted information relating to the recorded content are concurrently displayed on the display screen 112A, the output control part 121 specifies the posted information which is selected in response to a user's operation to select the posted information for the purpose of playing back the recorded content from the playback position. That is, the output control part 121 outputs the posted information, specified via a user's operation, to the posted time acquisition part 122 based on an operation signal which the operation part 111 generates in response to a user's operation.

The posted time acquisition part 122 acquires the posted time correlated to the posted information selected via a user's operation on the operation part 111. The server 4 stores a plurality of posted information in connection with the posted times, and therefore the server 4 sends the posted information, correlated to the posted time specified via a posted information request from the mobile terminal 1A, to the mobile terminal 1A. The posted time acquisition part 122 acquires the posted time, correlated to the posted information selected via a user's operation, from the output control part 121.

The playback position setting part 123 sets a top position of content based on the posted time acquired by the posted time acquisition part 122 (i.e. the posted time of the posted information selected via a user's operation). In the present embodiment, the playback position setting part 123 determines the playback position, corresponding to the posted time acquired by the posted time acquisition part 123, with reference to the time table in connection with the playback position of the recorded content. Based on the relationship of correspondence between the broadcast time of the recorded content and the posted time of the posted information, the playback position setting part 123 may calculate the playback position of the recorded content in connection with the posted information which was being posted on the WEB when the recorded content was being broadcast. For example, it is possible to calculate the elapsed time ranging from the broadcast start time of the recorded content to the posted time of the posted information, thus calculating the new playback position by adding the elapsed time to the playback start time corresponding to the playback position of the recorded content. Alternatively, the playback position setting part 123 may acquire the playback position correlated to the posted information with reference to the time table which stores playback times in connection with broadcast times or which stores playback times in connection with posted times. Specifically, the output control part 121 cooperates with the posted time acquisition part 122 and the playback position setting part 123 with reference to the time table which stores playback times of recorded contents in connection with broadcast times of recorded contents, thus displaying the video of the posted information, posted on the WEB at the broadcast time of the recorded content, on the display 112 or generating sound via the speaker 107. Additionally, the output control part 121 displays the video of the recorded content at the playback position corresponding to the broadcast time of the recorded content on the display 112 while generating sound via the speaker 107.

When the broadcast time is not linked with the posted time, for example, the server 4 may create a time table, which stores playback times of broadcast contents in connection with posted times of posted information, at the time of the posted information being posted on the WEB. In this connection, the playback position setting part 123 of the mobile terminal 1A may set the playback time of the recorded content with reference to the time table. When the mobile terminal 1A repeatedly plays back the broadcast content registered in the server 4, for example, the server 4 creates a time table which stores the playback position of the broadcast content being played back at the posted time of the posted information in connection with the posted information being posted on the WEB during the playback of the broadcast content.

As described above, the process of setting the playback position of the recorded content relating to the posted information acquires the playback position of the recorded content correlated to the posted information specified via a user's operation among a plurality of posted information displayed on the display screen 112A with reference to the time table which stores the playback position of the recorded content in connection with the posted time of the posted information posted on the WEB with respect to the recorded content.

The present embodiment is designed using the posted time representing the time of the posted information posted on the WEB; but this is not a restriction of the present invention. For example, the posted time may represent the playback time corresponding to the playback position of the recorded content. The playback time represents the elapsed time which is counted from the playback start time of the recorded content, i.e. zero seconds, and increased during the playback of the recorded content. The time table stores the playback position of the recorded content in connection with the playback time of the recorded content. In this connection, the time table is correlated to content data. In the present embodiment, the posted time acquisition part 122 acquires the playback position of the recorded content correlated to the posted information specified via a user's operation among a plurality of posted information displayed on the display 112 with reference to the time table which stores the playback time of the recorded content in connection with the broadcast time (or the posted time).

The playback position setting part 123 sets a top position of content as the playback position of the recorded content corresponding to the time preceding the posted time of the posted information selected via a user's operation. In the present embodiment, the playback position setting part 123 sets the playback position of the recorded content corresponding to the posted information selected via a user's operation as the previous playback position preceding the playback position of the recorded content (e.g. the posted time), correlated to the posted information selected via a user's operation, by a predetermined time. In this connection, the "predetermined time" is determined based on the number of posted information for each unit time, the type of contents being recorded or played back, or the amount of traffic, regarding the posted information submitted to the server 4, for each unit time.

The output control part 121 skips over to the playback position of the recorded content set by the playback position setting part 123 so as to execute a display instruction to restart playing back the recorded content from the playback position. Specifically, with reference to the time table which stores the playback position of the recorded content in connection with the posted time of the posted information being posted on the WEB with respect to the recorded content, the output control part 121 sends the posted information, specified via a user's operation on the operation part 111, to the display 112 while sending the recorded content, at the playback time correlated to the posted time of the posted information, to the display 112.

The posted information transmitter 124 transmits the posted information input via a user's operation. Specifically, when a user operates the submit button 1004 on the display screen 112A, the posted information transmitter 124 loads a character string input in the input field 1003 so as to transmit the posted information, i.e. the character string, to the server 4 via the communication part 106. To submit the posted information onto the WEB in connection with the currently broadcast content displayed on the display screen 112A, for example, a user may declare that the posted information is related to the currently broadcast content via a predetermined operation. In response to a user's operation, the posted information transmitter 124 transmits the posted information, added with a content ID of the currently broadcast content, to the server 4. For example, a user may declare that the posted information is related to the broadcast content by incorporating a hash tag, relating to the broadcast content, into the posted information or by incorporating a character string, correlated to the broadcast content, into the posted information. In this connection, the technology of submitting posted information, correlated to predetermined contents, to the WEB and the technology of sharing posted information with other users have been known.

The recording control part 125 executes a process of recording broadcast content data, received with the television broadcast receiver 105, in the storage unit 103. Specifically, the recording control part 125 inputs broadcast content data, received with the television broadcast receiver 105, so as to store broadcast content data in the content store area 133 of the storage unit 103. Thus, television broadcast content data, stored in the content store area 133, serve as recorded contents. The recording control part 125 is not necessarily limited to the above configuration. For example, the recording control part 125 may store desired contents, downloaded with the communication part 106 via the Internet 3, in the content store area 133. Contents downloaded via the Internet 3 have no limitation in terms of broadcast times of broadcast contents and can be downloaded at arbitrary times. Thus, playback positions of downloaded contents are not managed based on broadcast times but are managed based on playback times of contents.

The storage unit 103 stores various pieces of information used for the processing of the mobile terminal 1. For example, the storage unit 103 includes a program store area 131, a temporary store area 132, and a content store area 133. The storage unit 103 may include detachable portable memory devices (storage media) such as SD cards (Secure Digital Cards) and IC cards. Alternatively, the storage unit 103 can be installed in an external server (not shown).

The program store area 131 stores various applications and programs used to realize the functionality of the present embodiment in response to user's operations. The temporary store area 132 is a working area used to temporarily store various pieces of information necessary for the operation of the mobile terminal 1. The content store area 133 is used to store content data, for example, television broadcast content data received with the television broadcast receiver 105. The content store area 133 stores content IDs, which are received together with content data, and content-related information representing attributes of content data. Content IDs are unique identifications assigned to content data. For example, content-related information includes the names of TV stations broadcasting television programs having content data and information representing contents of television programs (e.g. names of performers and names of genres).

The antenna 104 receives electric waves having frequencies allocated to television broadcasting so as to send television broadcast signals, corresponding to the received electric waves, to the television broadcast receiver 105. The television broadcast receiver 105 is combined with the antenna 104 to achieve a television function, thus receiving content data of one-segment terrestrial digital television broadcasting towards the mobile terminal 1A, content-related information relating to content data, and program information representing electronic programs (EPG information: Electronic Program). The television broadcast receiver 105 includes an analog circuit which extracts broadcast data of preselected channels from television broadcast data received via the television antenna 104, and a digital circuit which carries out digital modulation on broadcast data. For example, the digital circuit carries out OFDM (Orthogonal Frequency Division Multiplexing) modulation on broadcast data, separates and decodes videos, sounds, data (e.g. text data) from multiplexed broadcast data, and decompresses compressed data.

The communication part 106 is connected to the wireless communication network 2 and the Internet 3 via the radio station 2A and the exchange 2B. For example, the communication part 106 receives posted information transmitted from the server 4 via the Internet 3.

Figure 4:
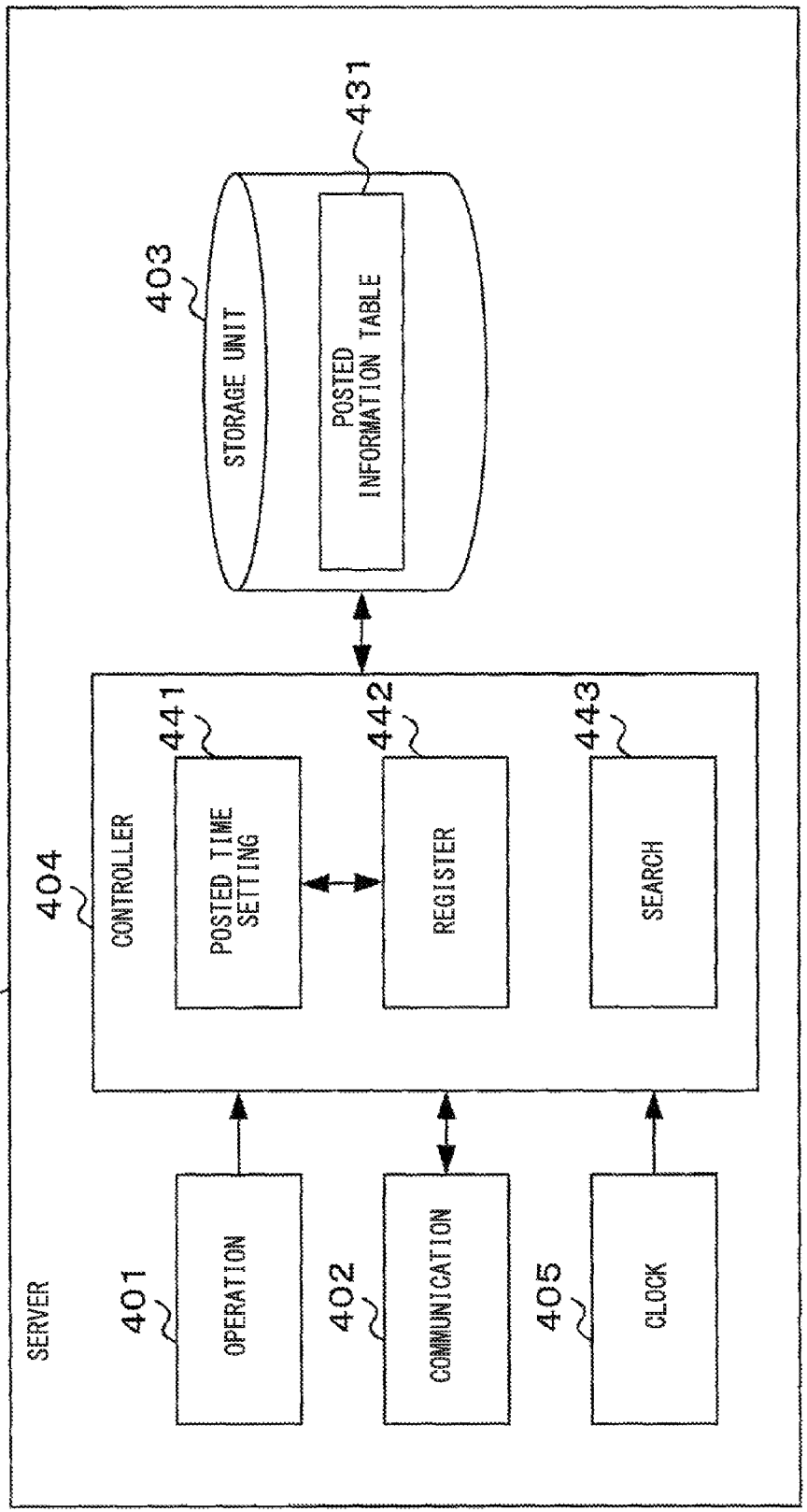
FIG. 4 is a block diagram showing an example of a server configuration.

FIG. 4 is a block diagram showing the configuration of the server 4. The server 4 includes an operation part 401, a communication part 402, a storage unit 403, a controller 404, and a clock 405. It is possible for the mobile terminal 1A to install part of the constituent elements and functions of the server 4. For example, it is possible for the mobile terminal 1A to install the function of the controller 404 of the server 4. The operation part 401 receives an operation of an administrator so as to output an operation signal. The communication part 402 communicates with the mobile terminal 1A via the Internet 3 and the wireless communication network 2. The storage unit 403 stores various data applied to the server 4. In the present embodiment, the storage unit 403 includes a posted information table 431. The posted information table 431 stores posted information posted on the WEB via the Internet 3.

FIG. 5 shows an example of the stored content of the posted information table 431. The posted information table 431 stores poster IDs, posted times, posted information, and content IDs in connection with each other. Poster IDs are unique identifications used to identify posters of posted information. Upon receiving a user's operation to submit posted information, the mobile terminal 1A adds a poster ID to the posted information. The poster ID added to the posted information is reflected in the poster ID of the posted information table 431. As the poster ID, for example, it is possible to use a device ID uniquely assigned to the mobile terminal 1A. The posted time represents the time of the posted information being posted on the WEB. The posted time which is set to the posted time setting part 441 in the controller 404 of the server 4 is reflected in the posted time of the posted information table 431. For example, the posted information represents a character string which is input by a user with the mobile terminal 1A.

The content ID represents an identifier uniquely specifying broadcast content relating to posted information. For example, the mobile terminal 1A transmits posted information relating to broadcast content, added with a content ID of broadcast content. Thus, the content ID added to the posted information transmitted from the mobile terminal 1A is reflected in the content ID of the posted information table 431. In this connection, it is not necessary to reflect an effective value in the content ID of the posted information table 431 with respect to posted information irrelevant to broadcast content. It is possible for the server 4 to allocate content IDs to contents. Specifically, the controller 404 of the server 4 receives the posted information from the mobile terminal 1A via the communication part 402 so as to extract a content-related character string or a pre-registered hash tag included in the posted information. The controller 404 refers to a predetermined content word relating to content based on the extracted information of the posted information (e.g. a hash tag or a content-related character string). When the extracted information matches the predetermined content word, the controller 404 writes the posted information, regarding the extracted information, in the posted information table 431 in connection with the content relating to the content word.

In FIG. 4, the controller 404 reads various data stored in the storage unit 403 so as to achieve the overall control on the server 4. The controller 404 includes a posted time setting part 441, a register 442, and a search part 443. The posted time of the posted information being posted on the WEB is set to the posted time setting part 441. Specifically, the posted time setting part 441 obtains the time clocked by the clock 405 at the timing in which the communication part 402 receives the posted information transmitted from the mobile terminal 1A via the Internet 3. The posted time setting part 441 sets the time obtained from the clock 405 as the posted time of the posted information received with the communication part 402. The register 442 stores the posted information received with the communication part 402 in the posted information table 431 in connection with the posted time set by the posted time setting part 441. The search part 443 searches desired posted information from the posted information table 431 of the storage part 403. On the other hand, the mobile terminal 1A transmits a posted information request requesting the server 4 to provide the posted information relating to the recorded content. Upon receiving a posted information request from the mobile terminal 1A with the communication part 402 of the server 4, the search part 443 searches the posted information relating to the recorded content from the posted information table 431 of the storage part 403. The search part 443 transmits the posted information to the mobile terminal 1A, i.e. a source of transmitting a posted information request, via the communication part 402.

In the server 4, the search part 443 may execute the following methods of searching posted information relating to recorded contents. In a first search method, the output control part 121 of the mobile terminal 1A transmits a posted information request including the content ID of the recorded content. The search part 443 searches the posted information correlated to the content ID included in the posted information request from the posted information table 431. In a second search method, a hash tag specifying the broadcast content is opened on the WEB during the broadcasting of the broadcast content being recorded as the recorded content with the mobile terminal 1A. A user of the mobile terminal 1A transmits the posted information, including a hash tag, relating to the broadcast content (i.e. the recorded content). Thus, the server 4 stores the posted information, including a hash tag, in the posted information table 431. Thereafter, the output control part 121 of the mobile terminal 1A transmits a posted information request, including a hash tag, to the server 4. The search part 443 searches the posted information, describing a hash tag included in the posted information request, from the posted information table 431. The second search method which searches posted information relating to recorded content based on a hash tag does not need any content IDs in the posted information table 431. Thereafter, the search part 443 searches the posted information relating to the recorded content from the posted information table 431 so as to transmit the posted information to the mobile terminal 1A via the communication part 402 together with the poster ID and the posted time.

Figure 6:
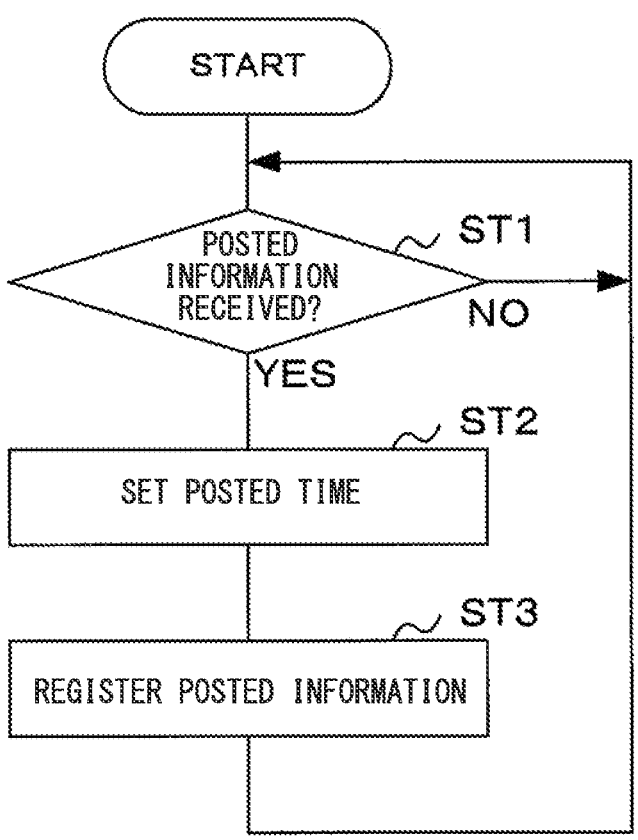
FIG. 6 is a flowchart showing a posted information registration process executed with a server controller.

FIG. 6 is a flowchart showing a posted information registration process executed by the controller 404 of the server 4.

(Step ST1)

In the server 4, the register 442 of the controller 404 is in a standby state until the communication part 402 receives posted information.

(Step ST2)

Upon receiving posted information in step ST1, the posted time setting part 441 sets the posted time of the posted information. That is, the posted time setting part 441 obtains the posted time as the time clocked by the clock 405 at the timing in which the communication part 402 receives the posted information.

(Step ST3)

The register 442 stores the posted information received via the communication part 402 in the posted information table 431 in connection with the posted time set by the posted time setting part 441 in step ST2. The communication part 402 receives the posted information added with the poster ID. The posted information relating to the broadcast content is added with the content ID of the broadcast content. As to each of posted information, the poster ID, the posted time, and the content ID are correlated to each other in the posted information table 431. As described in the second search method of the search part 443, the controller 404 of the server 4 extracts hash tags or content-related content words from posted information so as to write them as content IDs in the posted information table 431. Alternatively, the controller 404 may write content IDs, corresponding to content words extracted from posted information, in the posted information table 431.

Figure 7:
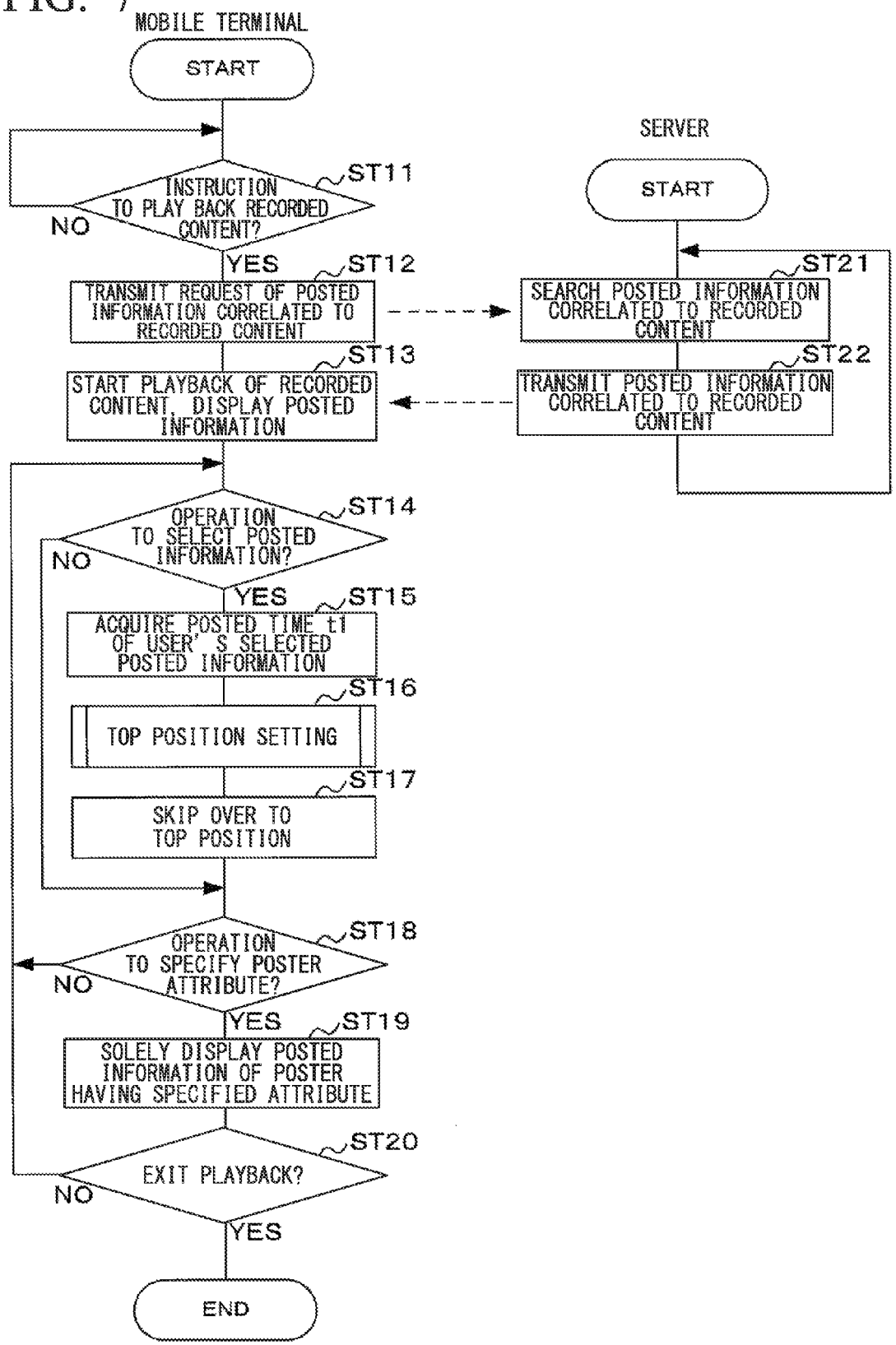
FIG. 7 is a flowchart showing a process in which the mobile terminal of the first embodiment links with a server to display recorded contents and posted information.

FIG. 7 is a flowchart showing the process of displaying recorded contents and posted information on the display 112 when the controller 102 of the mobile terminal 1A cooperates with the controller 404 of the server 4.

(Step ST11)

In the mobile terminal 1A, the output control part 121 of the controller 102 is in a standby state until a user issues a playback instruction to play back recorded content.

(Step ST12)

Upon receiving a user's operation regarding a playback instruction of recorded content in step ST11, the output control part 121 transmits a posted information request, requesting posted information relating to recorded content, to the server 4. In this connection, it is possible to omit step ST12 when the mobile terminal 1A obtains posted information from the server 4 in advance before obtaining recorded content (e.g. broadcast content).

(Step ST13)

Upon receiving the posted information, relating to the recorded content, transmitted from the server 4 in response to a posted information request, the output control part 121 starts playing back the recorded content subjected to a playback instruction due to a user's operation. Additionally, the output control part 121 displays the posted information on the display 112. Thus, as shown in FIG. 2, it is possible to concurrently display the recorded content and the posted information on the display screen 112A. At this time, the output control part 121 may display the posted information, correlated to the playback position of the recorded content displayed on the display 112, on the display 112 with reference to a time table which stores the playback position of the recorded content in connection with the posted time of the posted information relating to the recorded content.

(Step ST14)

The output control part 121 determines as to whether or not a user carries out an operation to select the posted information displayed in the posted information display area 1002 shown in FIG. 2. The flow proceeds to step ST17 when the output control part 121 determines that a user does not carry out an operation to select the posted information.

(Step ST15)

When the output control part 121 determines that a user carries out an operation to select the posted information in step ST14, the posted time acquisition part 122 acquires posted time t1 correlated to the posted information selected via a user's operation. That is, the posted time acquisition part 122 acquires the posted time of the posted information, specified via a user's operation on the operation part 111, from the posted information received with the server 4.

(Step ST16)

The playback position setting part 123 sets a top position of recorded content in response to the posted time t1 of the posted information selected via a user's operation. Details will be described later.

(Step ST17)

The output control part 121 skips over to a playback start position corresponding to a top position of the recorded content, which is set in step ST16, so as to carry out a display control operation to restart playing back the recorded content from the top position.

(Step ST18)

The output control part 121 determines as to whether or not a user carries out an operation to specify an attribute relating to a poster. The flow returns to step ST14 when the output control part 121 determines that a user does not carry out an operation to specify the attribute of a poster.

(Step ST19)

Upon determining that a user does not carry out an operation to specify the attribute of a poster in step ST18, the output control part 121 solely displays the posted information, correlated to the attribute of a poster specified via a user's operation, among a plurality of posted information received from the server 4 in step ST13 in the posted information display area 1002.

(Step ST20)

The output control part 121 determines as to whether or not the playback of the recorded content is ended. The flow returns to step ST14 when the playback of the recorded content is not ended. In contrast, the controller 102 of the mobile terminal 1A exits the process shown in FIG. 7 when the playback of the recorded content is ended.

(Step ST21)

In the server 4, the search part 443 of the controller 404 searches the posted information relating to the recorded content from the posted information table 431 in response to a posted information request transmitted from the mobile terminal 1A in step ST12.

(Step ST22)

The search part 443 transmits the posted information, searched from the posted information table 431, to the mobile terminal 1A via the communication part 402. In this case, the posted information is added with the poster ID, the content ID, and the posted time.

Figure 8:
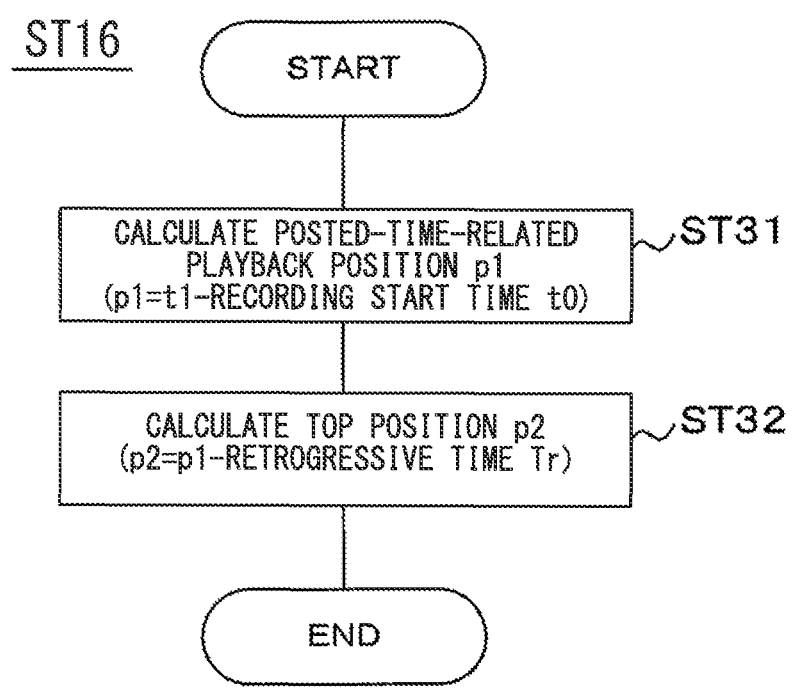
FIG. 8 is a flowchart showing a top position setting process in step ST16 of FIG. 7.

FIG. 8 is a flowchart showing a top position setting process in step ST16 of FIG. 7. In the following description, the playback position of the recorded content is not determined using the broadcast time of the broadcast content but determined using the playback time counted from the playback start time of "00:00".

(Step ST31)

The playback position setting part 123 calculates a posted-time-related playback position p1 by use of the posted time t1 obtained in step ST15 of FIG. 7. The posted-time-related playback position p1 indicates a playback position of recorded content at the posted time t1. In this connection, the recorded content at the posted-time-related playback position p1 is identical to the broadcast content at the posted time t1. The playback position setting part 123 calculates the posted-time-related playback position p1 based on the posted time t1 and the recording start time t0(00:00) via the following equation.

$$p1 = t1 - t0$$

The recording start time t1 is the time to start recording the broadcast content. According to the above equation, it is possible to calculate an elapsed time ranging from the recording start time t0 to the posted time t1. The posted-time-related playback position p1 represents a playback position at the timing when the elapsed time elapsed from the playback start time "00:00". The posted-time-related playback position p1 represents the playback position of the recorded content corresponding to the broadcast content being broadcast at the posted time t1. Since the recorded content refers to the broadcast content recorded with the mobile terminal 1A, it is possible to match the recording start time with the broadcast start time. Thus, the posted-time-related playback position p1 is related to the broadcast content at the timing when a desired broadcast time elapsed from the broadcast start time.

(Step ST32)

The playback position setting part 123 calculates a top position p2. The playback position setting part 123 calculates the top position p2 based on the posted-time-related playback position p1, calculated in step ST31, and a retrogressive time Tr via the following equation.

$$p2 = p1 - Tr$$

That is, the top position p2 is calculated as the playback time preceding the posted-time-related playback position p1 by the retrogressive time Tr.

Figure 9:
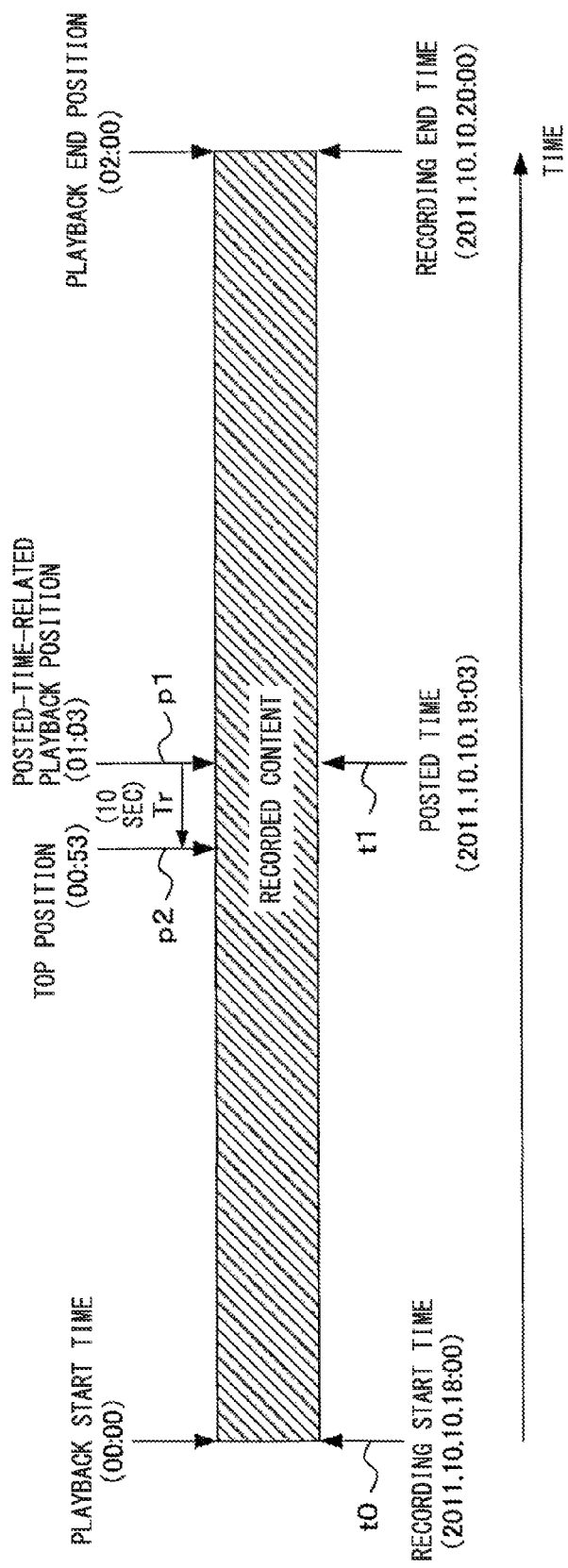
FIG. 9 is a time chart showing a concrete example of calculating a top position according to the process of FIG. 8.

A concrete example of calculating a top position according to the process of FIG. 8 will be described with reference to the time chart shown in FIG. 9. Herein, the total playback time of the recorded content is assumed to be two hours. This indicates that the playback end position is set to "02:00" counted from the playback start position of "00:00". Specifically, the recording start time t0 of the broadcast content is set to "2011.10.10.18:00" while the recording end time is set to "2011.10.10.20:00". As shown in FIG. 9, it is assumed that the playback position setting part 123 recognizes the posted time t1 at "2011.10.10.19:03" in step ST31. In this case, the posted-time-related playback position p1 calculated in step ST31 is identical to the time length of "01:03" (i.e. one hour and three minutes) ranging from "2011.10.10.18:00" to the posted time t1 of "2011.10.10.19:03". Herein, the retrogressive time Tr is set to 10 seconds in advance. In this case, the top position p2 calculated in step ST32 is equal to "00:53" (i.e. fifty-three minutes) preceding "01:03" by ten seconds.

Second Embodiment

Next, the second embodiment of the present invention will be described. Similar to the first embodiment, the second embodiment is realized using the mobile terminal 1A and the server 4, whereas the second embodiment differs from the first embodiment in terms of the functionality. A plurality of posted information is vertically displayed in a time-series manner, according to the order of posted times, in the posted information display area 1002 shown in FIG. 2. In other words, the display 112 aligns a plurality of posted information in a time-series manner, according to the order of posted times so as to display a plurality of posted information in the posted information display area 1002. A user may operate the operation part 111 so as to vertically scroll a plurality of posted information, displayed in the posted information display area 1002, in a time-series manner. The scroll operation moves a plurality of posted information in a time-series direction (e.g. a vertical direction of the posted information display area 1002) in the posted information display area 1002 which aligns and displays a plurality of posted information in a time-series manner according to the order of posted times. For example, a user may carry out a scroll operation by vertically flicking touch operations on the posted information or the posted information display area 1002.

The mobile terminal 1A of the second embodiment handles a user's scroll operation on the posted information display area 1002 as a user's operation to select the posted information. The scroll operation is designed to determine that a user may select the posted information displayed at the top line among a plurality of posted information displayed in the posted information display area 1002. In other words, it is determined that a user may select the posted information of the earliest posted time among a plurality of posted information displayed in the posted information display area 1002. However, the scroll operation is not necessarily limited to the above process. For example, the scroll operation can be redesigned to determine that a user may select the posted information displayed at the center line in the posted information display area 1002.

Owing to the scroll operation, the posted information displayed at the top line of the posted information display area 1002 can be varied forwards or backwards in a time-series direction according to the order of posted times. Based on the posted time of the posted information which can be varied sequentially, the output control part 121 skips over to the top position of the recorded content. The above display process can be regarded as the process of fast-forwarding or rewinding the recorded content in a user's scrolling direction relative to the posted information display area 1002. In other words, the mobile terminal 1A of the second embodiment is able to fast-forward or rewind the recorded content in response to a user's scroll operation on the posted information display area 1002.

Figure 10:
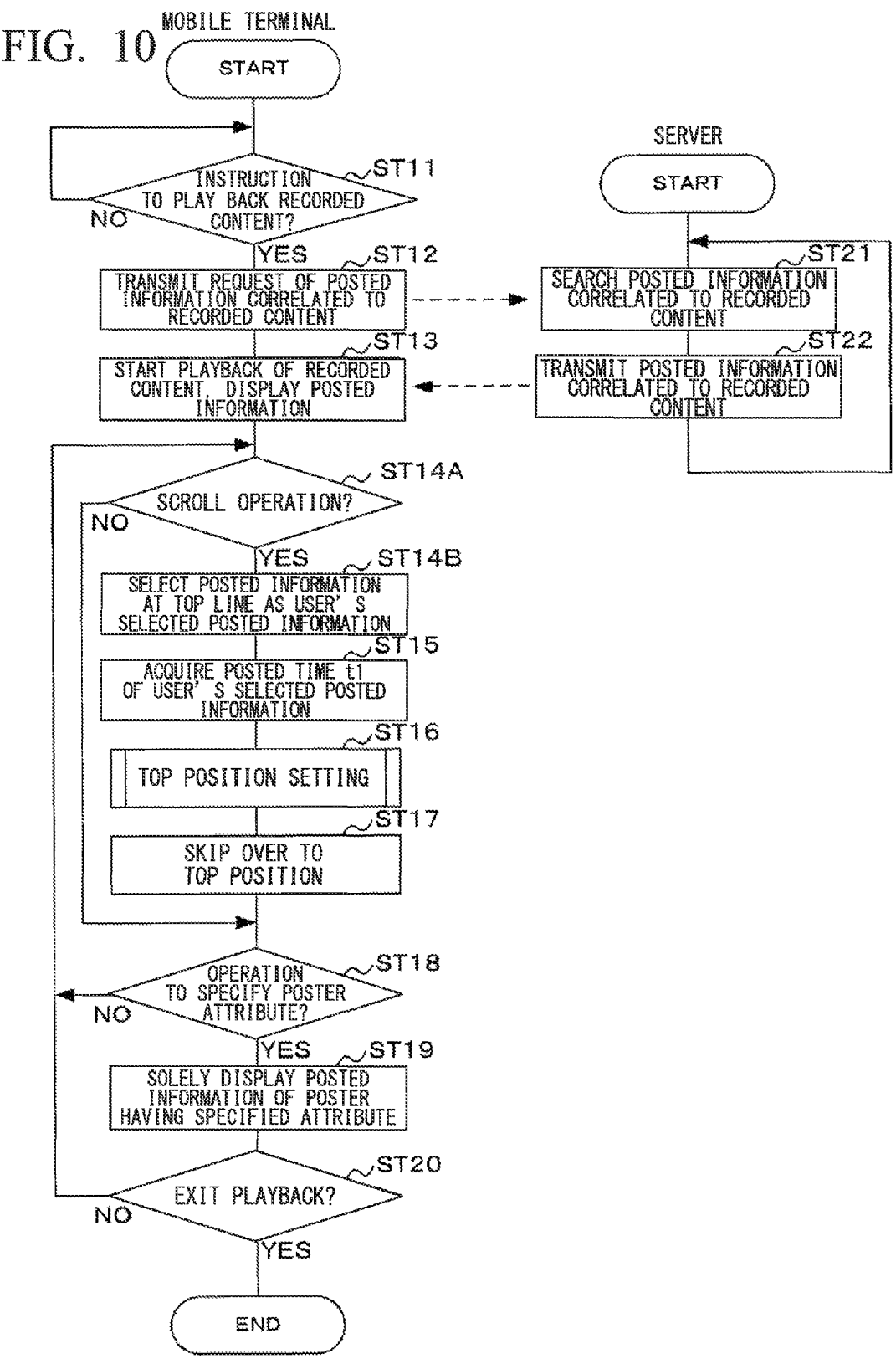
FIG. 10 is a flowchart showing a process in which a mobile terminal according to the second embodiment links with a server to display recorded contents and posted information.

FIG. 10 is a flowchart showing the process of displaying the recorded content and the posted information on the display 112 when the controller 102 of the mobile terminal 1A of the second embodiment cooperates with the controller 404 of the server 4. In FIG. 10, the parts identical to those shown in FIG. 7 are designated using the same reference signs. That is, steps ST11 to ST13 of FIG. 10 are identical to steps ST11 to ST13 of FIG. 7. The flowchart of FIG. 10 differs from the flowchart of FIG. 7 in terms of steps ST14A and ST14B.

(Step ST14A)

In the mobile terminal 1A, the output control part 121 is in a standby state until a user carries out a scroll operation on the posted information display area 1002.

(Step ST14B)

Upon receiving a user's scroll operation, the output control part 121 executes a display control operation to scroll a plurality of posted information in a time-series direction (e.g. an upper direction of the display screen 112A of FIG. 2) in the posted information display area 1002. The output control part 121 determines that a user may select the posted information at the top line though the posted information at the top line of the posted information display area 1002 is sequentially varied due to a scroll operation. Due to a user's touch operation on desired posted information displayed in the posted information display area 1002 and a user's flicking operation on the posted information in a vertical direction, for example, a plurality of posted information, displayed and aligned in a time-series direction in the posted information display area 1002, is scrolled in a time-progressing direction, and therefore the subsequently posted information posted subsequent to the posted information subjected to a user's touch operation will be displayed at the top line in the posted information display area 1002. It is possible to keep displaying and aligning a plurality of posted information in a time-series direction in the posted information display area 1002 after user carries out a scroll operation to scroll a plurality of posted information in a time-series direction in the posted information display area 1002. Additionally, the recorded content displayed in the content display area 1001 is subjected to fast-forward playback in a time-series direction due to a user's scroll operation on the posted information display area 1002. In this connection, it is possible for a user to increase the fast-forward playback speed by rapidly or intensely carrying out a flicking operation. Due to a user's touch operation on the posted information displayed in the posted information display area 1002 and a user's flicking operation on the posted information in a vertical direction, a plurality of posted information displayed and aligned in a time-series direction in the posted information display area 1002 is scrolled in a time-retrogressing direction, and therefore the previously posted information preceding the posted information subjected to a user's touch operation will be displayed at the top line in the posted information display area 1002. Thus, the recorded content displayed in the content display area 1001 is subjected to rewinding playback in a time-series direction in synchronization with the posted information of the posted information display area 1002. In this connection, it is possible for a user to increase the rewinding playback speed by rapidly or intensely carrying out a flicking operation.

Similar to the process of FIG. 7, the output control part 121 obtains the posted time t1 (step ST15), sets the top position (Step ST16), and skips over to the top position of the recorded content (step ST17) with respect to the posted information selected via a user's operation.

A series of steps ST14B to ST17 is repeatedly executed until a user stops a scroll operation to scroll the posted information in step ST14A. As a result, the recorded content displayed in the content display area 1001 is subjected to fast-forward playback or rewinding playback in response to a user's scroll operation to scroll the posted information in the posted information display area 1002. Steps ST18 to ST22 in FIG. 10 are similar to those in FIG. 7; hence, the descriptions thereof will be omitted.

In the first embodiment, the "retrogressive time Tr" is a fixed value; but this is not a restriction. In the second embodiment, for example, it possible to change the retrogressive time Tr based on the number of posted information posted on the WEB at posted times later than the posted time of the user's selected posted information. That is, it is possible to increase the retrogressive time Tr to be longer as the number of posted information, relating to a desired broadcast content, becomes larger. This indicates that the server 4 receives plenty of posted information in relation to broadcast contents. Due to the increasing number of posted information displayed in the posted information display area 1002 as the mobile terminal 1A plays back recorded contents, it is necessary to reduce the time to display each of posted information or to reduce the display space assigned to each of posted information. For example, it may be impossible to display all the posted information, relating to the recorded content, within the playback time of the recorded content, or it may be necessary to shift the playback position of the recorded content differently from the posted time of the posted information. Since the server 4 sets the received time of the posted information as the posted time, the server 4 may undergo an excessive traffic due to plenty of posted information transmitted thereto, and therefore the server 4 should cause a delay in setting the posted time subsequent to the transmission timing of the posted information. Due to a delay in setting the posted time, it is impossible to assign the posted information to the broadcast information in real time, thus causing the posted time to be delayed from the broadcast content. In this case, the posted information may be correlated to the broadcast content which was broadcast at the previous time preceding the posted time set by the server 4.

In the present embodiment which is designed to play back the recorded content from the playback position corresponding to the previous time preceding the posted time set to the posted information, it is possible to match the posted time with the recorded content even when the posted time is delayed from the broadcast content. The large number of posted time likely indicates increasing interests of viewers watching the broadcast content; hence, a user of the mobile terminal 1A may easily grasp the entirety of the recorded content by playing back and appreciating the recorded content from the previous time preceding the broadcast time by the predetermined time, and therefore a user may kindle interest in the recorded content in synchronization with increasing interests of viewers at the broadcast time. To demonstrate this effect, the present embodiment increases the retrogressive time Tr to be longer as the number of posted information, relating to the broadcast content, becomes larger while playing back the recorded content from the playback position corresponding to the previous time preceding the posted time set to the user's selected posted information, and therefore a user of the mobile terminal 1A is able to appreciate the recorded content, relating to the posted information, for a relatively long time.

Figure 11:
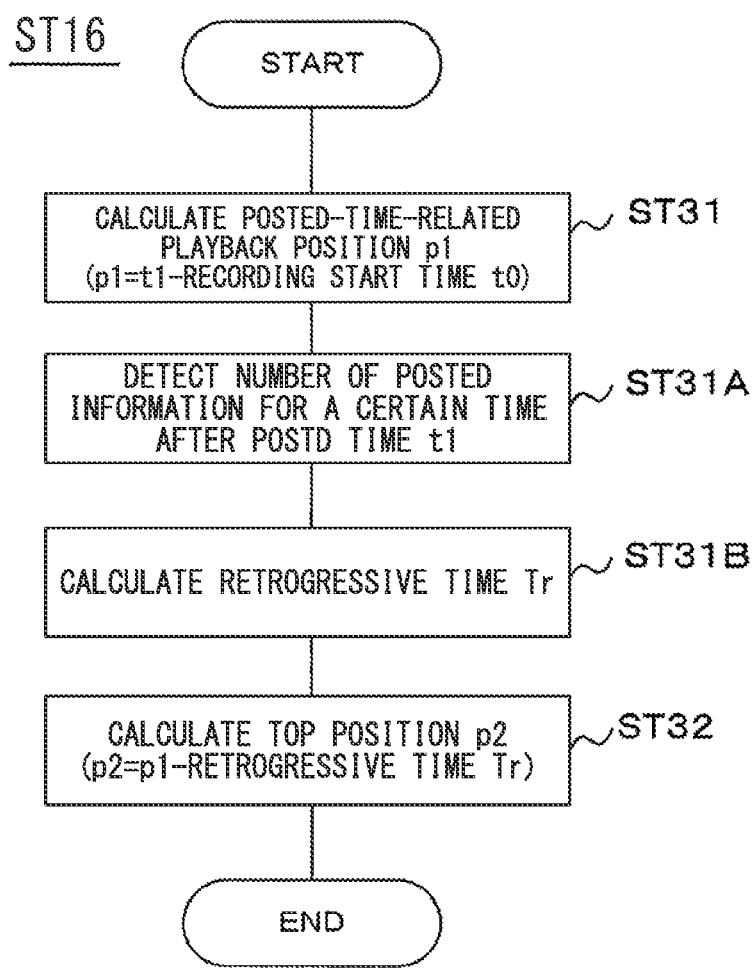
FIG. 11 is a flowchart showing a top position setting process in step ST16 of the flowchart of FIG. 10 applied to a mobile terminal according to the third embodiment of the present invention.

FIG. 11 is a flowchart showing the details of the top position setting process of step ST16 in FIG. 10. In FIG. 11, steps ST31 and ST32 are identical to those in FIG. 8.

(Step ST31A)

Upon calculating the posted-time-related playback position p1 in step ST31, the playback position setting part 123 detects the number of posted information which occurs in a predetermined time after the posted time t1. In other words, the playback position setting part 123 calculates the number of posted information being posted on the WEB during the predetermined unit time.

(Step ST31B)

The playback position setting part 123 calculates the retrogressive time Tr based on the number of posted information detected in step ST31A. The present embodiment does not need any limitation in determining the methods to calculate the retrogressive time Tr. As a simple method, it is possible to calculate the retrogressive time Tr by multiplying the number of posted information, detected by he playback position setting part 123, by a predetermined coefficient. Alternatively, it is possible to set a threshold, depending on the number of posted information for each unit time, thus assessing the retrogressive time Tr based on the threshold. In this case, the playback position setting part 123 determines as to whether or not the number of posted information being posted on the WEB for each unit time is equal to or above the threshold. When the number of posted information is equal to or above the threshold, the playback position setting part 123 assesses the retrogressive time Tr correlated to the threshold, thus determining the retrogressive time Tr depending on the number of posted information. Thereafter, in step ST32, the playback position setting part 123 calculates the top position p2 based on the posted-time-related playback position p1 and the retrogressive time Tr.

The first embodiment and the second embodiment are described such that the touch panel 101 is configured of the operation part 111 and the display 112; but this is not a restriction. For example, the display 112 may employ a display having touch sensors while the operation part 111 may employ an operation member such as a mouse, a keyboard, and buttons.

The information sharing system of the present embodiment (or the communication network system), the mobile terminal 1A, and the server 4 are each designed to include a computer system. The foregoing processes are drafted in the form of programs and stored in computer-readable storage media; hence, the computer system loads and executes programs. Herein, the "computer system" may include CPU, memory, OS (Operating System), and hardware such as peripheral devices. The "computer system" may use the WWW (World Wide Web) system and may include homepage providing environments (or homepage displaying environments).

Programs realizing the steps of the foregoing flowcharts or programs realizing the functions of the foregoing flowcharts are stored in computer-readable storage media, and therefore the compute system may load and execute programs from storage media, thus calculating the estimated values of posted information subjected to searching. In this connection, the "computer-readable storage media" may include flexible disks, magneto-optical disks, ROM, non-volatile rewritable memory such as flash memory, portable media such as CD-ROM, and storage devices such as hard disks installed in computer systems.

Additionally, the "computer-readable storage media" may include any materials storing programs for a certain time, such as the Internet, networks, telephone lines, and non-volatile memory (e.g. DRAM (Dynamic Random Access Memory)) installed in computer systems serving as servers and clients transmitting and receiving programs via communication lines. It is possible to transmit the foregoing programs from the storage device of the computer system to other computer systems via transmission media or via transmission waves propagating through transmission media. Herein, the "transmission media" may include any media having information transmitting functions, such as the Internet, networks, telephone lines, and communication lines. The foregoing programs may represent part of the functions of the embodiments. Alternatively, it is possible to draft differential programs (or differential files) which are combined with pre-installed programs of computer systems so as to achieve the functions of the embodiments.

Figure 12:
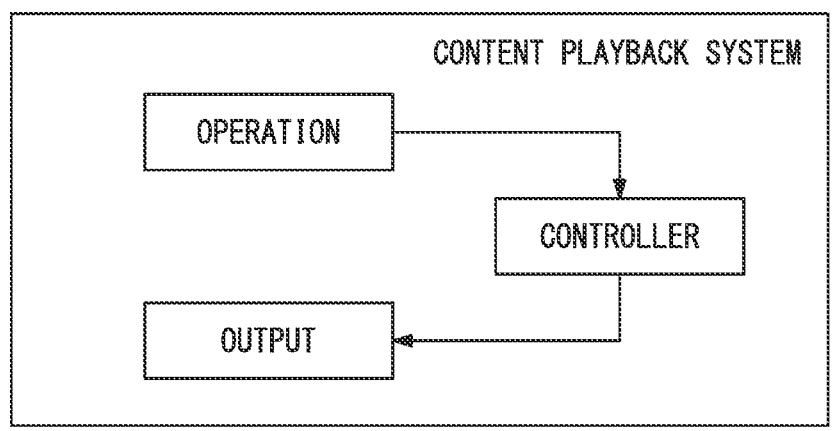
FIG. 12 is a block diagram showing the minimum configuration of a content playback system according to the present invention.

FIG. 12 is a block diagram showing the minimum configuration of the content playback system adopting the present invention (i.e. the system executing the information processing corresponding to the content and posted-information time-series link method being realized between the mobile terminal 1A and the server 4 via the information sharing system (WEB)). The content playback system includes an operation part to receive a user's operation, an output part to output desired content data while outputting posted information being posted on the WEB, and a controller to control the output part based on a user's operation on the operation part. The controller sends the posted information, specified by a user's operation on the operation part, to the output part with reference to a time table which stores playback positions of desired contents (e.g. broadcast contents) in connection with posted times of posted information, relating to contents, posted on the WEB. Thus, the controller sends contents to the output part in accordance with playback positions correlated to posted times of posted information displayed on the output part.

Lastly, the present invention is not necessarily limited to the embodiments and variations; hence, the present invention may embrace any design choices and modifications without departing from the technological creation defined by the appended claims.

INDUSTRIAL APPLICABILITY

The present invention is designed to link contents and posted information in a time-series manner so as to display them in information processing terminals when downloading various contents via information sharing systems (WEB) or when receiving and transmitting posted information. Thus, the present invention is applicable to any environments in which information processing terminals such as smart phones, tablet PCs, and notebook PCs communicate with various servers and sites via the Internet so as to mutually exchange desired information.

REFERENCE SIGNS LIST 1A, 1B mobile terminal
2 wireless communication network
2A base station
2B exchange
3 Internet
4 server
5 TV station
6 transmission antenna
7 recording media
8 external device
101 touch panel
102 controller
103 storage unit
104 antenna
105 television broadcast receiver
106 communication part
107 speaker
111 operation part
112 display
121 output control part
122 posted time acquisition part
123 playback position setting part
124 posted information transmitter
125 recording control part
131 program store area
132 temporary store area
133 content store area
401 operation part
402 communication part
403 storage unit
404 controller
405 clock
431 posted information table
441 posted time setting part
442 register
443 search part

The invention claimed is:

1. An information processing terminal configured to receive and store at least one content in association with a server configured to store a plurality of posted information along with a plurality of posted times, comprising:
 a touch panel comprising an operation part and
 an output part configured to play back the content along with the plurality of posted information stored in the server, wherein the output part allows a user to output user's posted information correlated to the content to the server; and
 a controller configured to determine a playback position of the content, correlated to the posted time of the posted information selected from among the plurality of posted information by the user with reference to a time table stored in a storage unit of the information processing terminal,
 wherein the storage unit is configured to store the playback position of the content in connection with the posted time of the posted information correlated to the content, wherein the controller determines the playback position of the content by subtracting a retrogressive time value from the posted time of the posted information, and
 wherein the controller increases the retrogressive time value based on a number of posted information being posted for each content.

2. The information processing terminal according to claim 1, wherein the output part has a display screen including a content display area configured to display the content and a posted information display area configured to display the plurality of posted information, wherein the controller arranges the plurality of posted information in the posted information display area in a time-series manner according to an order of the plurality of posted times and wherein, when the operation part receives a user's scroll operation to scroll the plurality of posted information in a time-series direction, the controller sends to the output part the content at the playback position correlated to the posted time of the posted information being displayed at a predetermined position in the posted information display area of the display screen.

3. The information processing terminal according to claim 1, wherein, when the operation part receives a user's operation to select the posted information from among the plurality of posted information displayed on the output part, the controller sends to the output part the content beginning from a previous playback position preceding the playback position correlated to the posted time of the posted information by a predetermined time depending on the number of posted information being posted for each unit time.

4. The information processing terminal according to claim 1, wherein the time table stores a playback position of a recorded content corresponding to a broadcast content in connection with a broadcast time of the broadcast content, and wherein the controller sends the posted information, being posted at the broadcast time of the broadcast content, to the output part while sending the recorded content, beginning from the playback position correlated to the broadcast time of the broadcast content, to the output part.

5. An information processing method adapted to an information processing terminal, the information processing terminal including a touch panel, a controller, and a storage unit, the information processing terminal being configured to receive and store at least one content in connection with a server configured to store a plurality of posted information along with a plurality of posted times, comprising:

playing back the content along with the plurality of posted information stored in the server;

outputting, to the server, user's posted information being posted by a user in connection with the content; and determining a playback position of the content, correlated to the posted time of the posted information selected from among the plurality of posted information by the user with reference to a time table, stored in the storage unit of the information processing terminal, configured to store the playback position of the content in connection with the posted time of the posted information correlated to the content, wherein the playback position is determined by subtracting a retrogressive time value from the posted time of the posted information, wherein the controller increases the retrogressive time value based on a number of posted information being posted for each content.

6. A content and posted information linking method adapted to an information processing terminal, the information processing terminal comprising a touch panel, a controller, and a storage unit, the information processing terminal in connection with a server configured to store a plurality of posted information along with a plurality of posted times, the content and posted information linking method comprising:

acquiring the plurality of posted information in connection with the content from the server;

displaying the plurality of posted information in a time-series manner according to an order of the plurality of posted times;

determining a playback position of the content, correlated to the posted time of the posted information selected from among the plurality of posted information by a user with reference to a time table, stored in the storage unit, configured to store the playback position of the content in connection with the posted time of the posted information, wherein the playback position is determined by subtracting a retrogressive time value from the posted time of the posted information, and wherein the controller increases the retrogressive time value based on a number of posted information being posted for each content; and playing back the content at the playback position.

7. The content and posted information linking method according to claim 6, wherein the touch panel has a display screen including a content display area configured to display the content and a posted information display area configured to display the plurality of posted information and wherein, upon receiving a user's scroll operation to scroll the plurality of posted information correlated to the content in a time-series direction, the content is played back at the playback position correlated to the posted time of the posted information being displayed at a predetermined position in the content display area of the display screen.

8. The content and posted information linking method according to claim 6, wherein due to a user's operation to select the posted information from among the plurality of posted information being displayed on a display screen, the content is played back from a previous playback position preceding the playback position correlated to the posted time of the posted information by a predetermined time depending on the number of posted information being posted for each unit time.

* * * * *